United States Patent
Taugher et al.

(10) Patent No.: US 8,264,942 B2
(45) Date of Patent: Sep. 11, 2012

(54) OPTICAL DISC EMBOSSED FEATURES

(75) Inventors: Lawrence N. Taugher, Loveland, CO (US); Paul W. Martin, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1446 days.

(21) Appl. No.: 11/259,844

(22) Filed: Oct. 26, 2005

(65) Prior Publication Data

US 2007/0092837 A1    Apr. 26, 2007

(51) Int. Cl.
*G11B 7/24* (2006.01)

(52) U.S. Cl. .................................. 369/275.1

(58) Field of Classification Search ........... 369/275.2; 428/64.1
See application file for complete search history.

(56) References Cited

U.S. PATENT DOCUMENTS

| | | | | |
|---|---|---|---|---|
| 4,987,301 A * | 1/1991 | Nakamura | ................ | 250/231.16 |
| 5,909,333 A * | 6/1999 | Best et al. | ................ | 360/51 |
| 5,917,182 A * | 6/1999 | Ishizuka | ................ | 250/237 G |
| 6,081,339 A * | 6/2000 | Southam et al. | ................ | 356/400 |
| 6,589,626 B2 * | 7/2003 | Selinfreund et al. | ................ | 428/64.1 |
| 6,721,485 B1 * | 4/2004 | Nakamura et al. | ................ | 385/143 |
| 6,738,335 B1 * | 5/2004 | Todori et al. | ................ | 369/94 |
| 6,753,064 B1 * | 6/2004 | Nakama et al. | ................ | 428/156 |
| 6,815,030 B2 | 11/2004 | Ishida et al. | | |
| 6,905,750 B2 * | 6/2005 | Nee | ................ | 428/64.1 |
| 6,938,162 B1 * | 8/2005 | Nagai et al. | ................ | 713/189 |
| 2002/0030705 A1 * | 3/2002 | Youngberg et al. | ................ | 347/2 |
| 2003/0044719 A1 * | 3/2003 | Katoh et al. | ................ | 430/270.13 |
| 2003/0174427 A1 * | 9/2003 | Hogan et al. | ................ | 360/60 |
| 2004/0106065 A1 * | 6/2004 | Miyamoto et al. | ................ | 430/270.13 |
| 2004/0113057 A1 * | 6/2004 | Fo et al. | ................ | 250/231.13 |
| 2004/0200957 A1 * | 10/2004 | Teng et al. | ................ | 250/231.13 |
| 2004/0218477 A1 * | 11/2004 | Belser et al. | ................ | 369/13.38 |
| 2004/0248093 A1 * | 12/2004 | Coombs et al. | ................ | 435/6 |
| 2004/0252142 A1 * | 12/2004 | Struk et al. | ................ | 347/2 |
| 2004/0253539 A1 * | 12/2004 | Uno et al. | ................ | 430/270.13 |
| 2005/0088957 A1 * | 4/2005 | Han et al. | ................ | 369/275.5 |
| 2006/0126474 A1 * | 6/2006 | Hanks | ................ | 369/59.1 |
| 2006/0274620 A1 * | 12/2006 | Haddad | ................ | 369/53.31 |
| 2007/0045526 A1 * | 3/2007 | Saidan et al. | ................ | 250/231.13 |
| 2007/0278392 A1 * | 12/2007 | Toh et al. | ................ | 250/231.13 |

* cited by examiner

Primary Examiner — Joseph Haley
Assistant Examiner — Henok Heyi

(57) ABSTRACT

A method for forming an optical disc includes forming a first disc portion, forming a second disc portion, coupling the first disc portion to the second disc portion, wherein forming the first disc portion includes forming a data recording layer, and wherein forming the second disc portion includes forming a material layer including a plurality of embossed features having a depth of approximately $\frac{1}{4}\lambda$ for optimized encoder compatibility, where $\lambda$ is the wavelength of a light source being used to sense the embossed features.

28 Claims, 7 Drawing Sheets

OPTICAL DISC EMBOSSED FEATURES

BACKGROUND

Optical recording media such as a write-once CD-R (Compact Disc-Recordable), DVD-R (Digital Versatile Disc-Recordable) and a rewritable CD-RW (CD-Re-writeable), DVD-RW (DVD-Re-writeable), Blu-ray and HD-DVD are being put into practical use or under further development. The optical discs may have a recording capacity ranging from hundreds of megabytes (MB) to more than 25 GB. Additionally, data can be recorded by a user on many current optical media. High-capacity data recording can be made with no loss of data quality due to remarkable improvement in performance of the large-capacity digital optical recording media and recording and reproducing apparatuses.

Additionally, a number of methods for generating labels on the upper surfaces of optical discs have recently been developed. One such method produces a color change in a layer of an optical disc by selectively exposing the layer to energy in the form of laser light that is absorbed by the layer and converted to heat. The heat effects an optical change in the label layer, thereby providing consumers with the ability to directly form identification labels on an optical disc. In order to controllably expose the label layer to laser light, an encoder often forms part of the label forming mechanism and codewheel features are employed on the optical disc to allow for measurement of disc position and rotational velocity. Recordable discs with this capability are commercially known as LightScribe discs.

SUMMARY

A method for forming an optical disc includes forming a first disc portion, forming a second disc portion, coupling the first disc portion to the second disc portion, wherein forming the first disc portion includes forming a material layer, including a plurality of embossed features having a depth of approximately $\frac{1}{4}\lambda$, wherein $\lambda$ is the wavelength of the laser light source which is close in wavelength to the light source being used to sense the embossed features.

Additionally, according to one exemplary embodiment, an optical disc having embossed features includes a first disc portion including a bottom layer, a recording layer disposed on the bottom layer, and a first reflective metallized layer disposed on the recording layer. The exemplary optical disc also includes a second disc portion coupled to the first disc portion including a top layer, embossed features formed on a surface of the top layer, and a second reflective metallized layer coupled to the embossed surface of the top layer, wherein the embossed features formed on a surface of the top layer have a depth of approximately $\frac{1}{4}\lambda$ for optimized encoder compatibility, wherein $\lambda$ is the wavelength of a light source being used to sense the embossed features.

BRIEF DESCRIPTION OF THE DRAWINGS

The accompanying drawings illustrate various embodiments of the present system and method and are a part of the specification. The illustrated embodiments are merely examples of the present system and method and do not limit the scope of the disclosure.

Throughout the drawings, identical reference numbers designate similar, but not necessarily identical, elements.

DETAILED DESCRIPTION

The present exemplary systems and methods provide for the formation of embossed features such as a codewheel on an optical disc such as a CD or DVD re-writeable optical disc, a Blu-ray optical disc, and/or an HD-DVD optical disc. According to one exemplary embodiment, the present system and method provide desired embossed features by embossing a traditionally dummy polycarbonate layer with pits having sufficient depth to create a codewheel diffraction grating that may be used with an optical encoder. Further details of the exemplary configurations, as well as exemplary methods for forming the exemplary configurations in a desired optical disc will be described in detail below.

As used in the present specification, and in the appended claims, the term "optical disc" is meant to be understood broadly as including, but in no way limited to, audio, video, multi-media, and/or software discs that are machine readable in a CD and/or DVD drive, or the like. Non-limiting examples of optical disc formats include writeable, recordable, and re-writeable discs such as, DVD-R, DVD-RW, DVD-R, DVD+RW, DVD-RAM, CD-R, CD-RW, Blu-Ray, HD-DVD and the like.

In the following description, for purposes of explanation, numerous specific details are set forth in order to provide a thorough understanding of the present systems and methods for forming a codewheel or other embossed features on an optical disc such as a re-writeable optical disc, a Blu-ray optical disc, and/or an HD-DVD optical disc. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Method

Figure 1B:
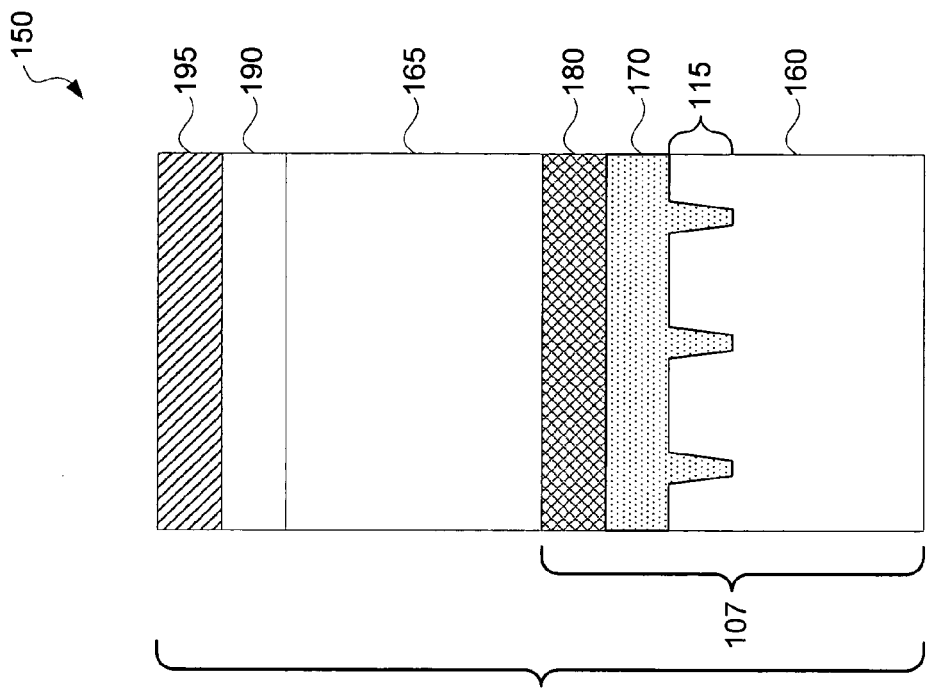
FIG. 1b illustrates a side cross-sectional view of a DVD-R and DVD-RW optical disc structure, as is known in the art.
Figure 1A:
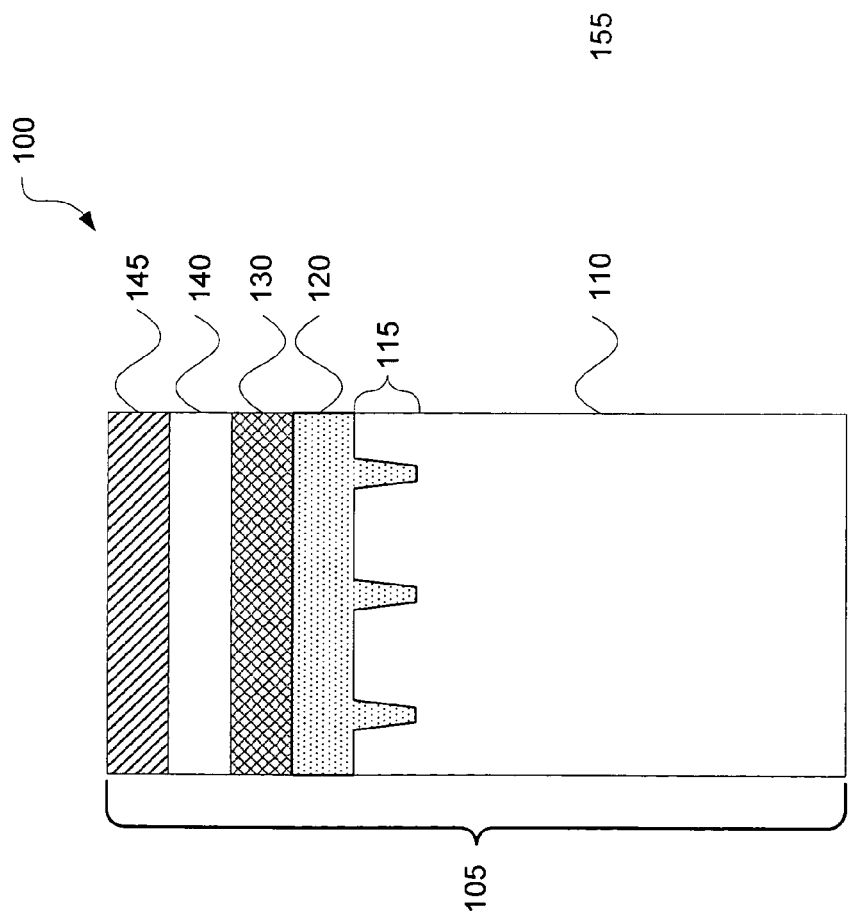
FIG. 1a illustrates a side cross-sectional view of a CD-R and CD-RW optical disc structure, as is known in the art.

FIG. 1a illustrates a cross-sectional view of a LightScribe CD (100) structure, according to the prior art. As illustrated in FIG. 1a, a traditional LightScribe CD-R (100) optical disc includes a number of layers including a bottom polycarbonate layer (110), a recording layer (120), a metallized layer (130), a lacquer layer (140), and a silk screened top image layer (145). As illustrated, a number of pre-groove and embossed features (115) are formed in the polycarbonate layer (110) and filled by the recording layer (120).

The recording layer of a traditional CD-R (100) optical disc includes an organic colorant configured to absorb irradiating laser light that causes a temperature increase at an exposed portion, resulting in a physical or chemical change (for example, formation of pits) and, in turn, a change in the optical properties of that portion, whereby information data is recorded and detected. Additionally, the metallized layer (130) includes a light-reflective material, typically containing metals such as gold, aluminum, and the like. Further, the lacquer (140) and the silk screened top imaging layer (120) form a protective layer to protect the data recording layer (120). Generally, the overall stack height (105) of traditional optical discs is approximately 1.2 mm+0.3/−0.1.

The top imaging layer (145) of the CD-R may include a thin thermochromic-imageable coating configured to experience a chemical change that shows up as a visible point on the top imaging layer when exposed to light from a laser. During image formation on the top imaging label, the CD-R optical disc (100) is inverted such that the top imaging layer (145) is directly adjacent to the laser. The top imaging layer (145) is then selectively irradiated by the laser. Rotation of the CD-R (100) optical disc is tracked by an encoder that views and reads the embossed features (115) as a codewheel. For best encoder performance, the embossed features (115) have an approximate pit depth of $¼\lambda$ where $\lambda$ is the wavelength of the laser light which is similar in wavelength to the source being used to illuminate the embossed features.

Similar to the CD-R optical disc illustrated in FIG. 1a, FIG. 1b illustrates the components of a LightScribe DVD-R optical disc (150), as is known in the art. As shown, the LightScribe DVD-R (150) includes a bottom polycarbonate layer (160) having a number of pre-groove and embossed features (115) formed therein. Similarly, a recording layer (170) is formed to fill the embossed features (115), followed by a reflective metallized layer (180). In contrast to the above-mentioned CD-R (100) configuration, the traditional DVD-R optical disc (150) has a second dummy polycarbonate layer (165) behind the metallized layer (180) followed by the lacquer (190) forming a protective barrier, and a top image layer (195) for labeling. As shown, the DVD-R media (150) has a general overall height (155) of approximately 1.2 mm+0.3/−0.1, per optical disc standards. However, in contrast to the CD-R optical disc, the data reading surface distance (107) measured from the bottom polycarbonate layer (160) to the metallized layer (180) is approximately 0.6 mm, per DVD structure specifications while a CD optical disc must have a minimum of approximately 1.1 mm between the surface of the bottom polycarbonate layer (110) and the top of the metallized layer (130) for proper operation.

While the embossed features in the LightScribe recordable optical discs (100, 150) illustrated in FIGS. 1a and 1b may be viewed through a top image layer and have sufficient pit depth to create a diffraction grating for proper encoder operation, re-writeable optical discs are not manufactured with sufficient depth for proper operation of the encoder if a codewheel was created with embossed features at this depth. Rather, re-writeable optical discs have traditionally been manufactured with pit depths of much less than $¼\lambda$ resulting in discs that are not optimized for position and velocity data acquisition with an encoder. Further, other types of optical disc formats, such as Blu-Ray and HD-DVD formats, have the recordable/data area covering the embossed feature location, preventing the formation of traditional embossed features at the embossed feature location. Consequently, FIG. 2 illustrates an exemplary method for forming an optical disc with secondary embossed features of sufficient depth to optimize position acquisition by an encoder, thereby enabling image formation on a top image layer, according to one embodiment.

Figure 2:
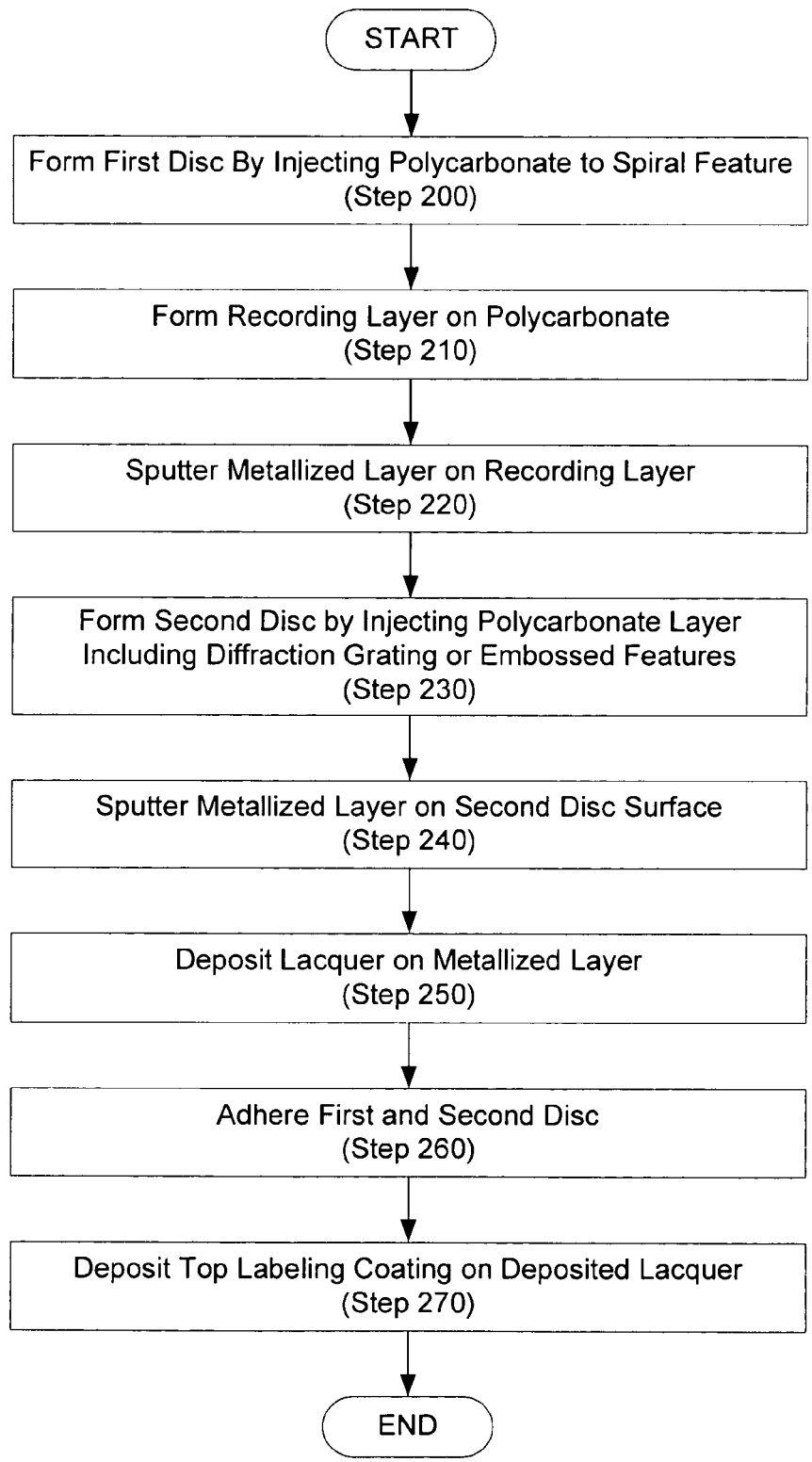
FIG. 2 illustrates a method for forming an embossed feature on an optical disc, according to one exemplary embodiment.

As illustrated in FIG. 2, the exemplary method begins by forming a first portion of a desired optical disc by injecting polycarbonate or another similarly workable transparent material into a mold to form traditional spiral feature (step 200). Once the traditional spiral feature is formed (step 200), a recording layer may be formed on the spiral surface (step 210), followed by a sputtering of a reflective metallized layer (step 220), as is traditionally practiced in the art.

Additionally, a second portion of the disc may be independently formed by injecting polycarbonate or another similarly workable transparent material into a mold to form desired pit depths, thereby providing a proper diffraction grating or embossed features (step 230). With the desired embossed features formed on the second portion of the disc, a reflective metallized layer may be sputtered on the embossed surface of the second portion of the disc (step 240). With both the first and second disc portions substantially formed according to the present exemplary method, the first and second disc portions may be coupled together with an adhesive (step 260), followed by a deposition of a protective lacquer (step 250). Once combined, an imageable top label coating may then be deposited on the protective lacquer (step 270) to complete formation of the desired optical disc. Further details of the present exemplary optical disc forming method, followed by exemplary structures formed according to the present exemplary method, will be provided below.

As mentioned, the first step of the present exemplary optical disc formation method includes forming a first disc portion by injecting a polycarbonate or other material into a mold to form a spiral feature (step 200). According to one exemplary embodiment, the formation of the first disc portion is performed as is traditionally known in the art. Specifically, a mold including traditional spiral embossed features is injected with a desired substrate material.

Once the traditional spiral feature is formed (step 200), the recording layer may be formed on the spiral surface (step 210), as is traditionally known. According to one exemplary embodiment, the recoding layer may be any number of phase-change compounds used in forming re-writeable optical media After the formation of the recording layer (step 210), a reflective metallized layer may be sputtered onto the recording layer (step 220).

Independent of the formation of the first portion of the desired disc, a second portion of the desired disc may be formed. According to one exemplary embodiment, the second portion of the disc may be formed by injecting polycarbonate or another similarly transparent material into a mold to form desired pit depths to provide a proper diffraction grating (step 230). In one exemplary embodiment, the polycarbonate or other similarly transparent material may be injected into a mold having a number of raised surface elements corresponding to the desired pit depths for providing a proper diffraction grating. As mentioned previously, any number of materials that are substantially optically transparent may be used to form desired pit depths. According to the present exemplary embodiment, embossed features having pits with a height of approximately $¼\lambda$ wavelength of light used by the encoder may be formed to optimize use of an encoder with the optical disc during label formation.

With the desired embossed features formed on the second portion of the disc (step 230), a metallized layer may be sputtered onto the embossed surface of the second portion of the disc (step 240). Similar to the exemplary embodiment illustrated above, the metallized layer may serve as a reflective surface to aid in the detection of the previously formed embossed features or diffraction grating. Additional features may also be formed on the second disc portion, including, but in no way limited to, additional data recording layers, as will be described in further detail below with reference to FIG. 5.

Once the desired embossed features are formed on the second portion of the disc (step 230) followed by the deposition of a reflective metallized layer (step 240), a protective lacquer (step 250) may be formed on the metallized layer to form a protective coating With both the first and second disc portions substantially formed according to the present exemplary method, the first and second disc portions may be coupled together with an adhesive (step 260) as is used in the art to combine such optical discs as Double Layer optical discs. According to one exemplary embodiment, the first and second disc portions of the optical disc may be coupled together with any number of appropriate, adhesives. During the coupling process, the first and second disc portions may be aligned using any number of aligning devices prior to being coupled. Once coupled, the adhesive may be cured, according to one exemplary embodiment, by the application of ultraviolet (UV) light.

After the first and second disc portions are coupled together by an adhesive (step 260), a top label coating may be deposited on the protective lacquer layer (step 270). As described previously, the top label coating may include a thin thermochromic coating configured to experience a chemical change that shows up as a visible point on the top imaging layer when exposed to light from a laser. According to one exemplary embodiment, the deposition of the top label coating may include, but is in no way limited to, a silk screen process.

Exemplary Structures

As mentioned, the size standards for optical disc layers are controlled to optimize performance. Consequently, layer dimensions of the above-mentioned optical disc layers may be modified to comply with size standards for the various media types. Exemplary optical disc formats formed by the above-mentioned exemplary method will be described in detail below with reference to FIGS. 3-7b.

CD-RW Media

Figure 3:
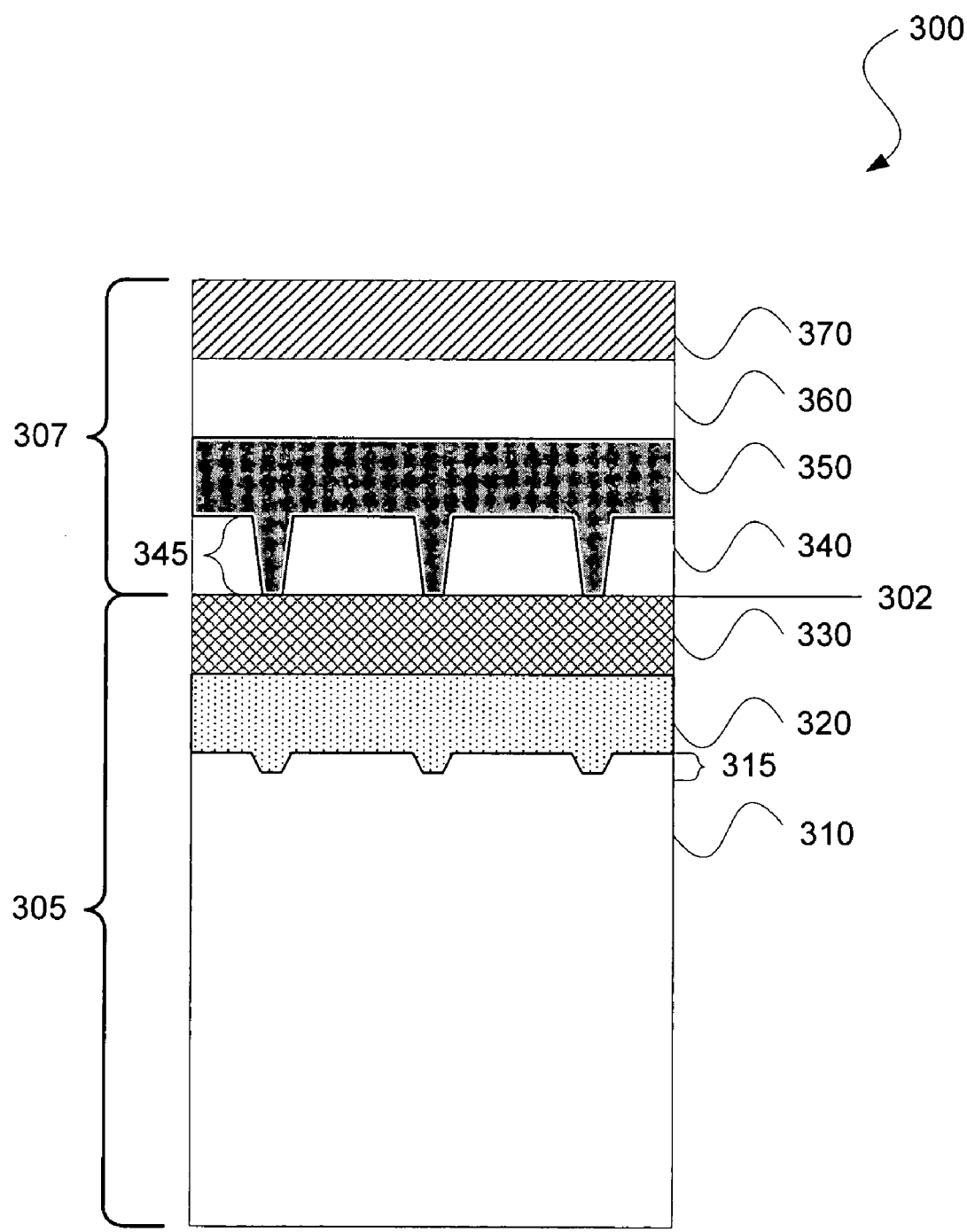
FIG. 3 illustrates a cross-sectional side view of an exemplary CD-RW optical disc formed according to the exemplary method of FIG. 2.

FIG. 3 illustrates a CD-RW optical disc (300) formed according to the exemplary method illustrated in FIG. 2. As shown in FIG. 3, the exemplary CD-RW (300) includes a fist disc portion (305) and a second disc portion (307) combined at an adhesive interface (302). According to the illustrated embodiment, the first disc portion (305) of the CD-RW optical disc (300) includes the standard recording components of traditional CD-RW optical discs including, but not limited to, a bottom polycarbonate layer (310) having a spiral track (315) formed therein. Additionally, a recording layer (320) is disposed on the spiral surface of the polycarbonate layer (310) followed by a deposited reflective metallized layer (330).

Additionally, the second disc portion (307) includes a number of traditional components including, but not limited to, a top protective lacquer layer (360), a metalized layer (350) and a top imaging layer (370). However, in contrast to traditional CD-RW optical discs, the present exemplary CD-RW optical disc (300) includes a polycarbonate layer (340) including a number of embossed features (345) having a depth of approximately ¼λ (where λ is the light illuminating the embossed features) for optimized diffraction grating formation and encoder compatibility.

According to the exemplary CD-RW optical disc (300) illustrated in FIG. 3, the first (305) and second disc portions (307) are coupled by an adhesive at the adhesive interface (302). According to one exemplary embodiment, to allow for the additional polycarbonate layer (340) containing the embossed features (345), the typical CD-RW disc specification for thickness tolerance is tightened and the nominal thickness is reduced. More specifically, the thickness or height of the first disc portion (305) is reduced to facilitate the inclusion of the additional polycarbonate layer (340) while maintaining optical integrity of the disc. As illustrated, the second disc portion (307) may have a thickness of approximately 0.3 mm while the first disc portion (305) has a thickness of approximately 1.1 mm+0.1/−0.1, to assure compatibility and readability with existing CD-RW technology. As will be illustrated below, other optical disc media types may maintain their typical disc specifications and tolerances while practicing the present exemplary method.

DVD-RW, DVD-RAM, HD-DVD

Figure 4:
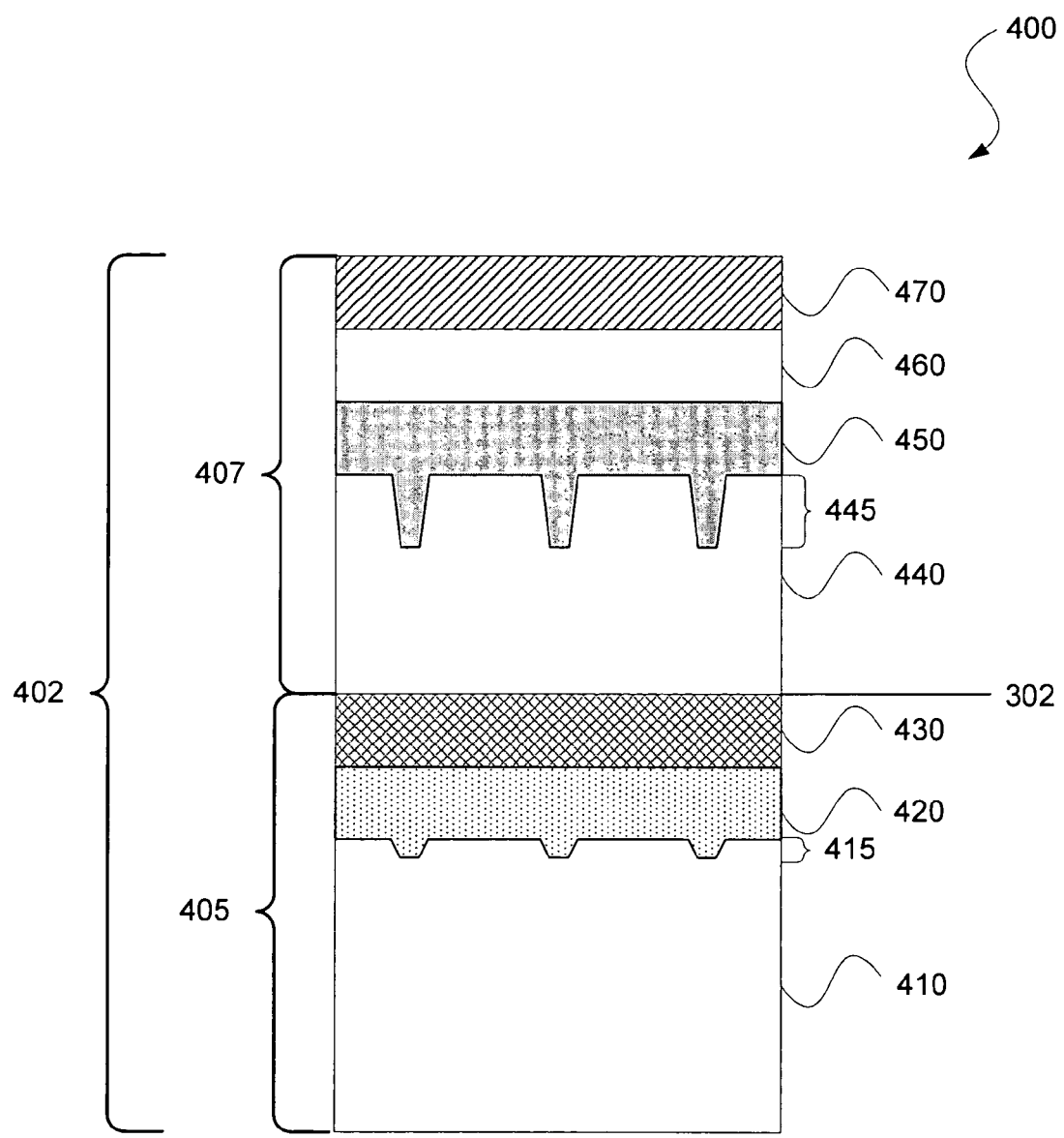
FIG. 4 illustrates a cross-sectional side view of an exemplary DVD-RW, DVD-RAM, or HD-DVD optical disc structure formed according to the exemplary method of FIG. 2.

FIG. 4 illustrates an exemplary optical disc structure (400) that may be used to form a DVD-RW optical disc, a DVD-RAM optical disc, or an HD-DVD optical disc. As illustrated, the optical disc (400) includes a first disc portion (405) and a second disc portion (407) coupled at an adhesive interface (305) to form the entire height (402) of the optical disc structure (400). As shown, the first disc portion (405) includes the layers of a traditional DVD-RW, DVD-RAM, or HD-DVD optical disc including a bottom polycarbonate layer (410) having a spiral track (415) formed therein. As mentioned, the spiral track (415) formed in the bottom polycarbonate layer (410) do not have sufficient depth to create a diffraction grating for an optical encoder. Additionally, a recording layer (420) is disposed on the spiral track surface of the polycarbonate layer (410) followed by a deposited reflective metallized layer (430). According to one exemplary embodiment, the first disc portion (405) has a traditional height of approximately 0.6 mm to comply with traditional DVD optical disc specifications.

Again, the second disc portion (407) includes a top protective lacquer layer (460) and a top imaging layer (470). However, as illustrated, the second disc portion (407) also includes a polycarbonate layer (440) containing a number of embossed features (445) having a depth of approximately ¼λ (where λ is the wavelength of the light illuminating the embossed features) for optimized encoder compatibility. According to one exemplary embodiment, the embossed features (445) are added to a blank polycarbonate surface during formation of the exemplary optical disc (400) prior to adhesion to the first disc portion (405). Further, a reflective metallized layer (450) is formed between the polycarbonate layer (440) and the protective lacquer layer (460). According to the present exemplary embodiment, the overall height (402) of the optical disc structure (400) has the traditional dimensions of 1.2 mm+0.3/−0.1.

Double Layer Optical Disc

Figure 5:
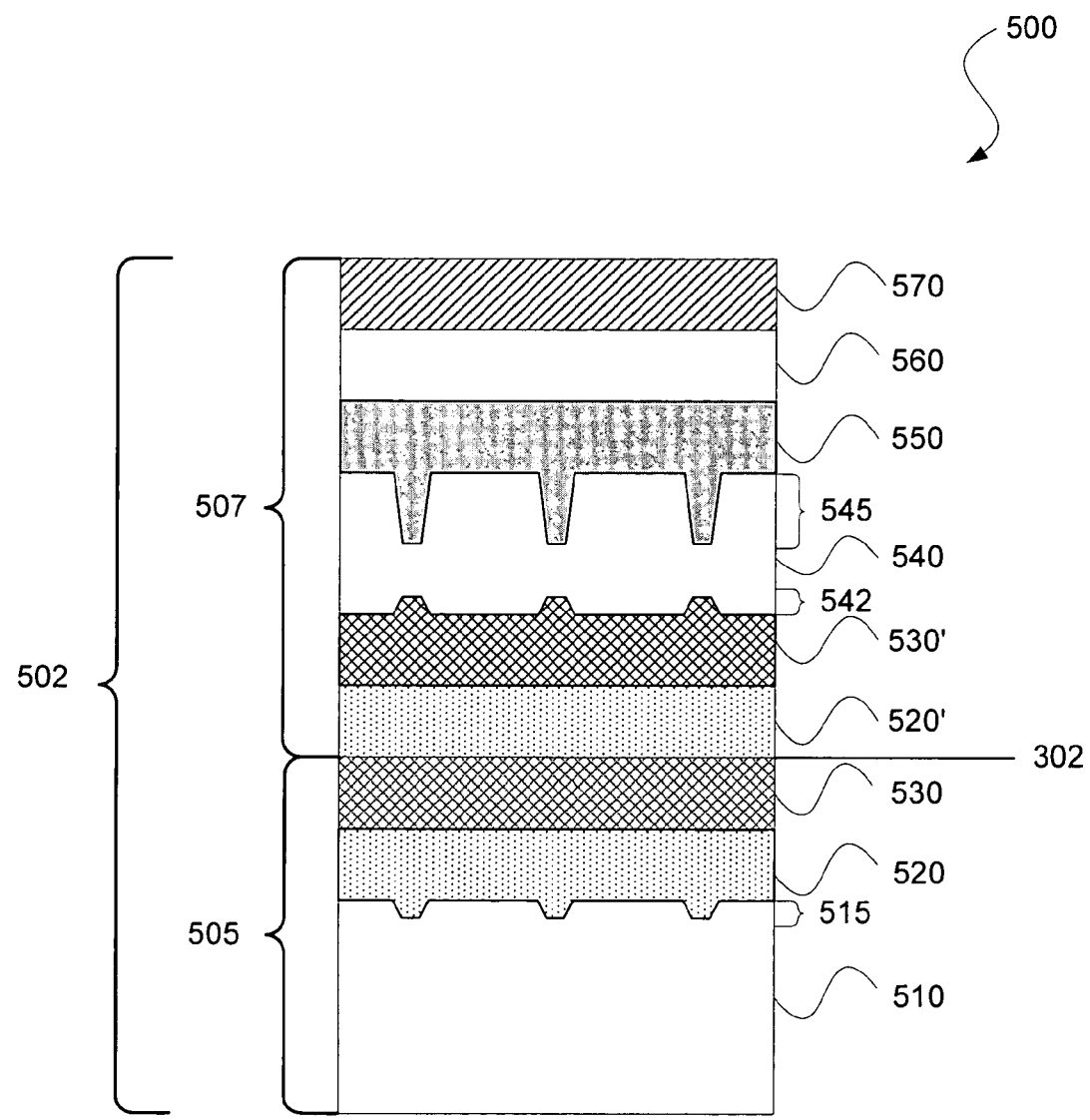
FIG. 5 illustrates a cross-sectional side view of an exemplary DVD dual layer optical disc structure formed according to the exemplary method of FIG. 2.

According to one exemplary embodiment, a double layer optical media may be formed according to the present exemplary method, as illustrated in FIG. 5. An exemplary DVD double layer optical disc structure (500) is illustrated in FIG. 5, according to the present exemplary method. As shown, the exemplary DVD double layer optical disc structure (500) is separated into a first disc portion (505) and a second disc portion (507), forming the overall height (502) of the optical disc. According to the illustrated embodiment, the first (505)

and second disc portions (507) are coupled at an adhesive interface (305) by any of the above-mentioned adhesive materials.

According to the exemplary illustrated embodiment, the first disc portion (505) includes the structural layers traditionally included in a DVD format optical disc. Specifically, the first disc portion (505) includes a bottom polycarbonate layer (510) including a spiral track (515) formed therein. Additionally, a recording layer (520) is disposed on the spiral track surface of the polycarbonate layer (510) followed by a deposited metallized semi-reflective layer (530). The incorporation of a metallized semi-reflective layer (530) allows an optical data detecting device to detect data that may be present in the second disc portion (507). According to one exemplary embodiment, the first disc portion (505) has a traditional height of approximately 0.6 mm to comply with traditional DVD optical disc specifications.

However, in contrast to traditional DVD optical disc specifications, the exemplary DVD double layer optical disc structure (500) includes a second disc portion (507) having a second recording layer (520') and a reflective metallized layer (530') forming the bottom layers of the second disc portion (507) respectively. As illustrated, the recording layer (520') and the reflective metallized layer (530') are directly coupled to the semi-reflective metallized layer (530) by an adhesive at the adhesive interface (305). According to the exemplary embodiment illustrated in FIG. 5, the reflective metallized layer (530') of the second disc portion (507) fills a spiral track (542) formed in a bottom surface of the polycarbonate layer (540) formed in the second disc portion (507). The formation of the second recording layer (520') and the reflective metallized layer (530') on the second disc portion (507) provides for the formation of two data layers in the DVD dual layer optical disc (500).

Moreover, as illustrated in FIG. 5, the polycarbonate layer (540) formed in the second disc portion (507) includes a number of embossed features (545) having a depth of approximately ¼λ (where λ is the wavelength of the light illuminating the embossed features) for optimized encoder compatibility, formed on a first side, and a number of relatively shallow pits (542) formed on a second side, according to the exemplary method illustrated in FIG. 2. Further, a reflective metallized layer (550) is formed between the polycarbonate layer (540) and a protective lacquer layer (560) and a top imaging layer (570). According to the present exemplary embodiment, the overall height (502) of the DVD dual layer optical disc structure (500) has the traditional dimensions of 1.2 mm+0.3/−0.1.

Blu-Ray Optical Discs

In addition to the above-illustrated optical disc structures, the exemplary method illustrated in FIG. 2 may be used to form Blu-ray optical disc structures or any other desired optical disc structure. Specifically, the Blu-ray and HD-DVD optical disc structures may benefit from the present exemplary method due to the data structure specifications for Blu-ray and HD-DVD optical discs. According to the disc structure specifications, the recordable/data area of Blu-ray and HD-DVD optical discs is exploited to maximize data content. However, the maximization of the recordable/data area of the Blu-ray and HD-DVD optical discs encroaches upon the area of the optical disc typically reserved for the mirror band which is the location the embossed features. Consequently, the embossed features may be relocated, according to the present exemplary method.

Figure 6:
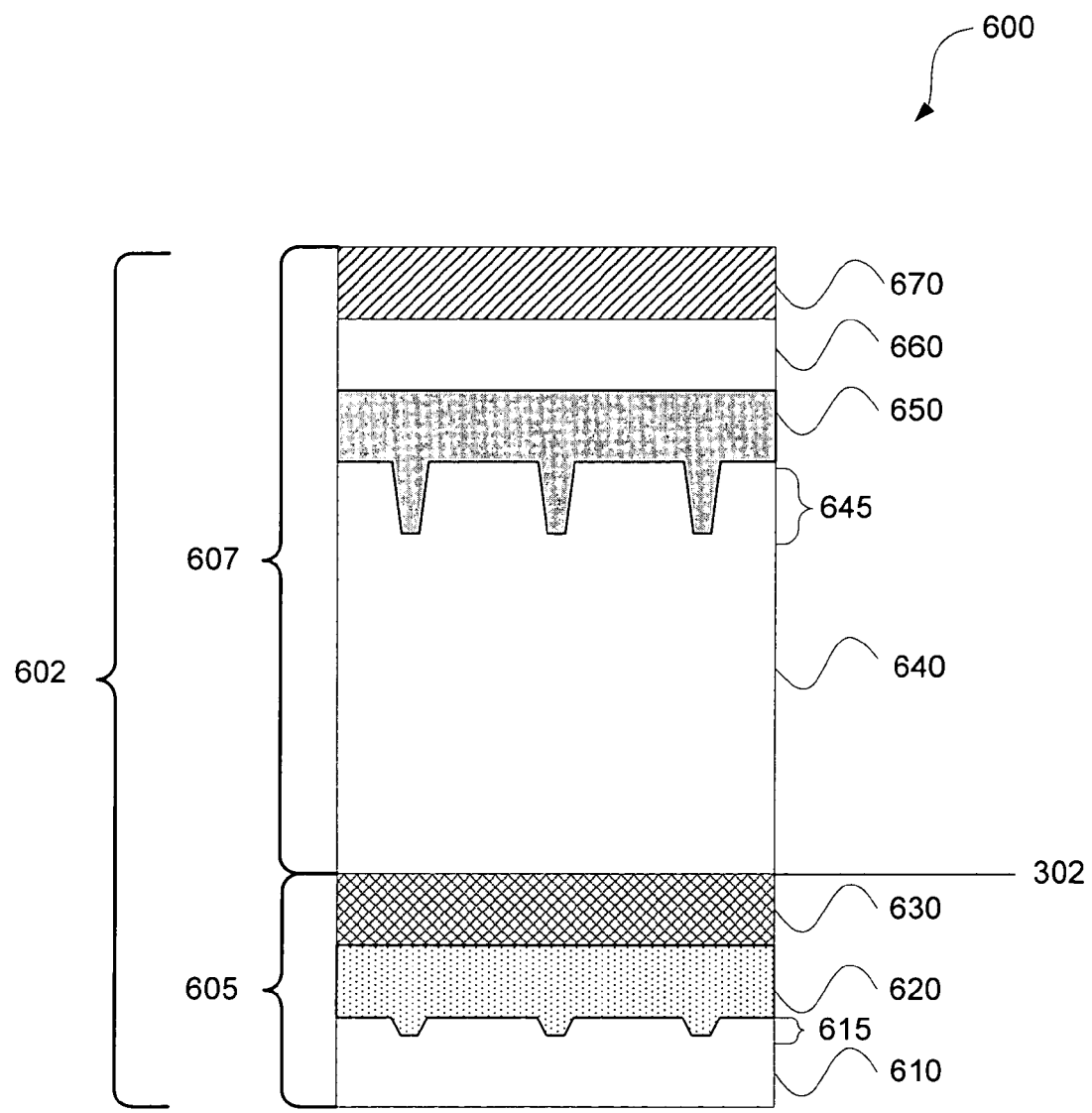
FIG. 6 illustrates a cross-sectional side view of a high density optical disc such, as a Blu-ray optical disc, formed according to the exemplary method of FIG. 2.

FIG. 6 illustrates a Blu-ray optical disc structure (600) formed according to the present exemplary method. Specifically, the Blu-ray optical disc structure (600) is divided into a first disc portion (605) and a second disc structure (607) joined at an adhesive interface (302) to form the overall height (602) of the Blu-ray optical disc structure.

According to the exemplary embodiment illustrated in FIG. 6, the first disc portion (605) contains a bottom polycarbonate layer (610) including a spiral track (615) formed therein. Additionally, a recording layer (620) is disposed on the spiral track surface of the polycarbonate layer (610) followed by a deposited reflective metallized layer (630). According to Blu-ray specifications, the first disc portion (605) of the exemplary Blu-ray optical disc structure (600) has a height of approximately 0.1 mm.

Similar to the optical disc structures illustrated above, the second disc portion (607) of the Blu-ray optical disc structure (600) includes a polycarbonate layer (640) including a plurality of embossed features (645) having a depth of approximately ¼λ (where λ is the wavelength of the light illuminating the embossed features) for optimized encoder compatibility, according to the exemplary method illustrated in FIG. 2. Further, a reflective metallized layer (650) is formed between the polycarbonate layer (640) and a protective lacquer layer (660) and a top imaging layer (670). Again, the overall height (602) of the exemplary Blu-ray optical disc structure (600) corresponds to the optical disc standard height of approximately 1.2 mm+0.3/−0.1. By forming the polycarbonate layer (640) including a plurality of embossed features (645) in the second disc portion (607), the recordable/data area of the first disc portion may be expanded without negatively affecting the tracking of the encoder device during imaging of the top imaging layer (670).

According to one exemplary embodiment, each of the above-mentioned optical disc configurations includes an additional embossed polycarbonate layer containing the desired embossed features and a reflective metallized layer formed adjacent to the embossed features. FIG. 7*a* illustrates the complete label side of the disc having a metallized layer and 7*b* illustrate only the mirror band being metallized. In either case the embossed features are always in the mirror band location on the disc. According to one exemplary embodiment illustrated in FIG. 7*a*, an optical disc (700), formed according to the present exemplary method, displays an entire planar surface (710) covered by the additional reflective metallized layer (720). Forming the additional reflective metallized layer (720) on the entire planar surface (710) of the optical disc may cause warpage due to expansion and contraction of moisture between the metallized layer as a result of temperature and humidity changes during use or storage.

Figure 7B:
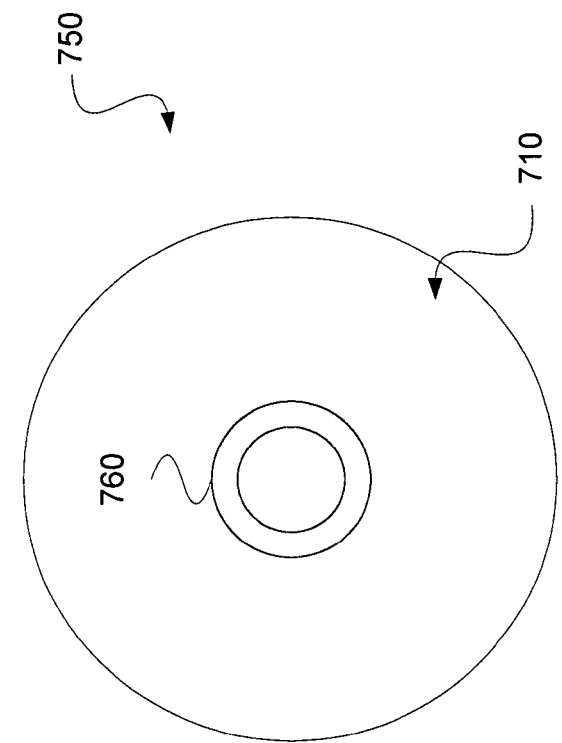
FIG. 7b illustrates an optical disc having only a mirror band portion thereof metallized, according to one exemplary embodiment.
Figure 7A:
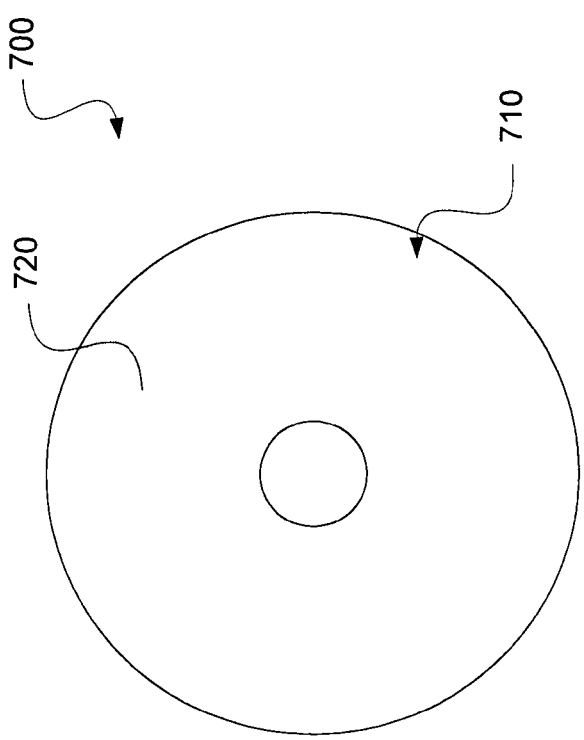
FIG. 7a illustrates an optical disc having a metallized data area, according to one exemplary embodiment.

In contrast to FIG. 7*a*, FIG. 7*b* illustrates a structure that may reduce warpage due to expansion and contraction of moisture trapped between metallized layers. As illustrated in FIG. 7*b*, the exemplary optical disc (750) includes a metallized layer (760) limited to the inner most part of the optical disc, an area known as the mirror band. According to this exemplary embodiment, embossed features to create a desired diffraction grating are in the mirror band, while limiting the area for moisture to be trapped, thereby limiting and/or reducing the likelihood of warpage.

In conclusion, the present exemplary systems and methods provide for the formation of embossed features such as diffraction grating codewheels on optical discs having an imageable label layer. In particular, the present exemplary systems and methods for forming codewheels and other embossed features on such optical discs as re-writeable optical discs, Blu-ray discs, and HD-DVD discs includes forming a first disc portion and a second disc portion, wherein the second disc portion includes a substrate, optionally substantially transparent, with desired embossed features formed therein, backed by a reflective metallized material. According to the present exemplary system and method, the desired embossed features may have a depth of approximately ¼λ (where λ is the wavelength of the light illuminating the embossed features) for optimized encoder compatibility. Once formed, the first disc portion and the second disc portion may be coupled together with an adhesive to form a desired optical disc with embossed features.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A method for forming a rewritable optical disc, comprising: forming a first disc portion; forming a second disc portion; coupling said first disc portion to said second disc portion; wherein forming said first disc portion includes forming a data recording layer; and wherein forming said second disc portion includes forming a material layer including forming a codewheel diffraction grating from a plurality of embossed features, said codewheel diffraction grating being formed for use by an optical encoder outputting position and velocity data for said optical disc, said embossed features having a depth of approximately ¼λ for optimized encoder compatibility, where wherein λ is the wavelength of a light source being used to sense said embossed features.

2. The method of claim 1, wherein said forming said second disc portion further comprises:
   depositing a reflective metallized material on said plurality of embossed features;
   applying a protective lacquer coating onto said reflective metallized material; and
   applying a top imageable layer on top of said protective lacquer coating.

3. The method of claim 2, wherein applying a top imageable layer on top of said protective lacquer coating comprises screen printing a thermochromic-imageable coating onto said protective lacquer coating.

4. The method of claim 1, wherein said forming a material layer including a plurality of embossed features comprises injecting a material into a mold having mating protrusions associated with said embossed features.

5. The method of claim 1, wherein said forming said first disc portion further comprises generating a data layer of a CD-RW optical disc having a height of approximately 1.1 mm.

6. The method of claim 5, wherein said forming said second disc portion further comprises depositing a second layer of said CD-RW optical disc having a height of approximately 0.3 mm.

7. The method of claim 1, wherein said forming said first disc portion further comprises forming a data layer of a DVD-RW, a DVD-RAM, or an HD-DVD disc having a height of approximately 0.6 mm.

8. The method of claim 7, wherein said forming said second disc portion further comprises depositing a second layer of said DVD-RW, DVD-RAM, or HD-DVD disc having a height of approximately 0.6 mm.

9. The method of claim 8, wherein said forming said second disc portion further comprises generating a data recording layer on said second disc portion.

10. The method of claim 1, wherein said forming said first disc portion further comprises forming a data layer of a Blu-ray optical disc having a height of approximately 0.1 mm.

11. The method of claim 10, wherein said forming said second disc portion further comprises depositing a second layer of said Blu-ray optical disc having a height of approximately 1.1 mm.

12. The method of claim 1, further comprising limiting a formation of said plurality of embossed features to a mirror band of said disc.

13. The method of claim 1, wherein said coupling said first disc portion to said second disc portion comprises:
   inserting an adhesive between said first disc portion and said second disc portion;
   aligning said first disc portion and said second disc portion;
   joining said first disc portion and said second disc portion with said adhesive between said first disc portion and said second disc portion; and
   curing said adhesive.

14. A rewritable optical disc having embossed features comprising: a first disc portion including a bottom layer, a recording layer disposed on said bottom layer, and a first reflective metallized layer disposed on said recording layer; a second disc portion coupled to said first disc portion including a top layer, embossed features formed on a surface of said top layer, and a second reflective metallized layer coupled to said embossed surface of said top layer; wherein said embossed features formed on a surface of said top layer form a codewheel diffraction grating configured for use by an optical encoder outputting position and velocity data for said optical disc.

15. The optical disc of claim 14, wherein said first disc portion and said second disc portion are coupled by an adhesive.

16. The optical disc of claim 14, wherein said second disc portion further comprises:
   a protective lacquer layer formed on said second reflective metallized layer; and
   a top imageable layer disposed on top of said protective lacquer layer, wherein said top imageable layer includes a thermochomic imageable coating deposited on said protective lacquer coating.

17. The optical disc of claim 14, wherein said embossed features are formed on a mirror band portion of said optical disc.

18. The optical disc of claim 14, wherein said optical disc comprises a CD-RW optical disc wherein:
   said first disc portion has a stack height of approximately 1.1 mm; and
   said second disc portion has a stack height of approximately 0.3 mm.

19. The optical disc of claim 14, wherein said optical disc comprises one of a DVD-RW, a DVD-RAM, or an HD-DVD, wherein:
   said first disc portion has a stack height of approximately 0.6 mm; and
   said second disc portion has a stack height of approximately 0.6 mm.

20. The optical disc of claim 19, wherein said optical disc comprises a dual layer optical disc having a data recording layer on said second disc portion.

21. The optical disc of claim 14, wherein said optical disc comprises a Blu-ray optical disc, wherein:
   said first disc portion has a stack height of approximately 0.1 mm; and
   said second disc portion has a stack height of approximately 1.1 mm.

22. The optical disc of claim 14, wherein said second disc portion further comprises:

a protective lacquer coating formed on said reflective metallized material; and a top image layer disposed on top of said protective lacquer coating.

23. A re-writeable compact disc (CD-RW) comprising:
a first disc portion including a bottom layer, a recording layer disposed on said bottom layer, and a first reflective metallized layer disposed on said recording layer, said first disc portion having a height of approximately 1.1 mm; and a second disc portion coupled to said first disc portion including a top layer, embossed features formed on a surface of said top layer, and a second reflective metallized layer coupled to said embossed surface of said top layer;

in which said embossed features form a codewheel diffraction grating configured for use by an optical encoder outputting position and velocity data for said optical disc.

24. The CD-RW of claim 23, wherein said embossed features formed on a surface of said top layer have a depth of approximately ¼λ for optimized encoder compatibility, where λ is the wavelength of a light source being used to sense said embossed features.

25. The CD-RW of claim 23, further comprising:
a protective lacquer coating coupled to said second reflective metallized layer; and a top imageable layer including a thermochromic imageable coating coupled to said protective lacquer coating.

26. A digital versatile disc (DVD) comprising:
a first disc portion including a bottom layer, a data layer disposed on said bottom layer, and a first reflective metallized layer disposed on said data layer, said first disc portion having a height of approximately 0.6 mm;

a second disc portion coupled to said first disc portion including a top layer, embossed features formed on a surface of said top layer, a second reflective metallized layer coupled to said embossed surface of said top layer, and a top imageable layer including a photo-imageable dye coating disposed on said second disc portion, wherein said second disc portion has a height of approximately 0.6 mm;

wherein said embossed features formed on a surface of said top layer form a codewheel diffraction grating configured for use by an optical encoder outputting position and velocity data for said optical disc, and said embossed features have a depth of approximately ¼λ for optimized encoder compatibility, where λ is the wavelength of a light source being used to sense said embossed features.

27. The DVD of claim 26, wherein said second disc portion further comprises a data layer coupled to said top layer.

28. A Blu-ray optical disc comprising:
a first disc portion including a bottom layer, a data layer disposed on said bottom layer, and a first reflective metallized layer disposed on said data layer, said first disc portion having a height of approximately 0.1 mm;

a second disc portion coupled to said first disc portion including a top layer, embossed features formed on a surface of said top layer, a second reflective metallized layer coupled to said embossed surface of said top layer, and a top imageable layer including a photo-imageable dye coating disposed on said second disc portion, wherein said second disc portion has a height of approximately 1.1 mm;

wherein said embossed features formed on a surface of said top layer form a codewheel diffraction grating configured for use by an optical encoder outputting position and velocity data for said optical disc, and said embossed features have a depth of approximately ¼λ for optimized encoder compatibility, where λ is the wavelength of a light source being used to sense said embossed features.

* * * * *

UNITED STATES PATENT AND TRADEMARK OFFICE
CERTIFICATE OF CORRECTION

PATENT NO. : 8,264,942 B2
APPLICATION NO. : 11/259844
DATED : September 11, 2012
INVENTOR(S) : Lawrence N. Taugher et al.

Page 1 of 1

It is certified that error appears in the above-identified patent and that said Letters Patent is hereby corrected as shown below:

In column 10, line 39, in Claim 16, delete "thermochomic" and insert -- thermochromic --, therefor.

Signed and Sealed this
Twelfth Day of February, 2013

Teresa Stanek Rea
*Acting Director of the United States Patent and Trademark Office*